Patented Mar. 7, 1939

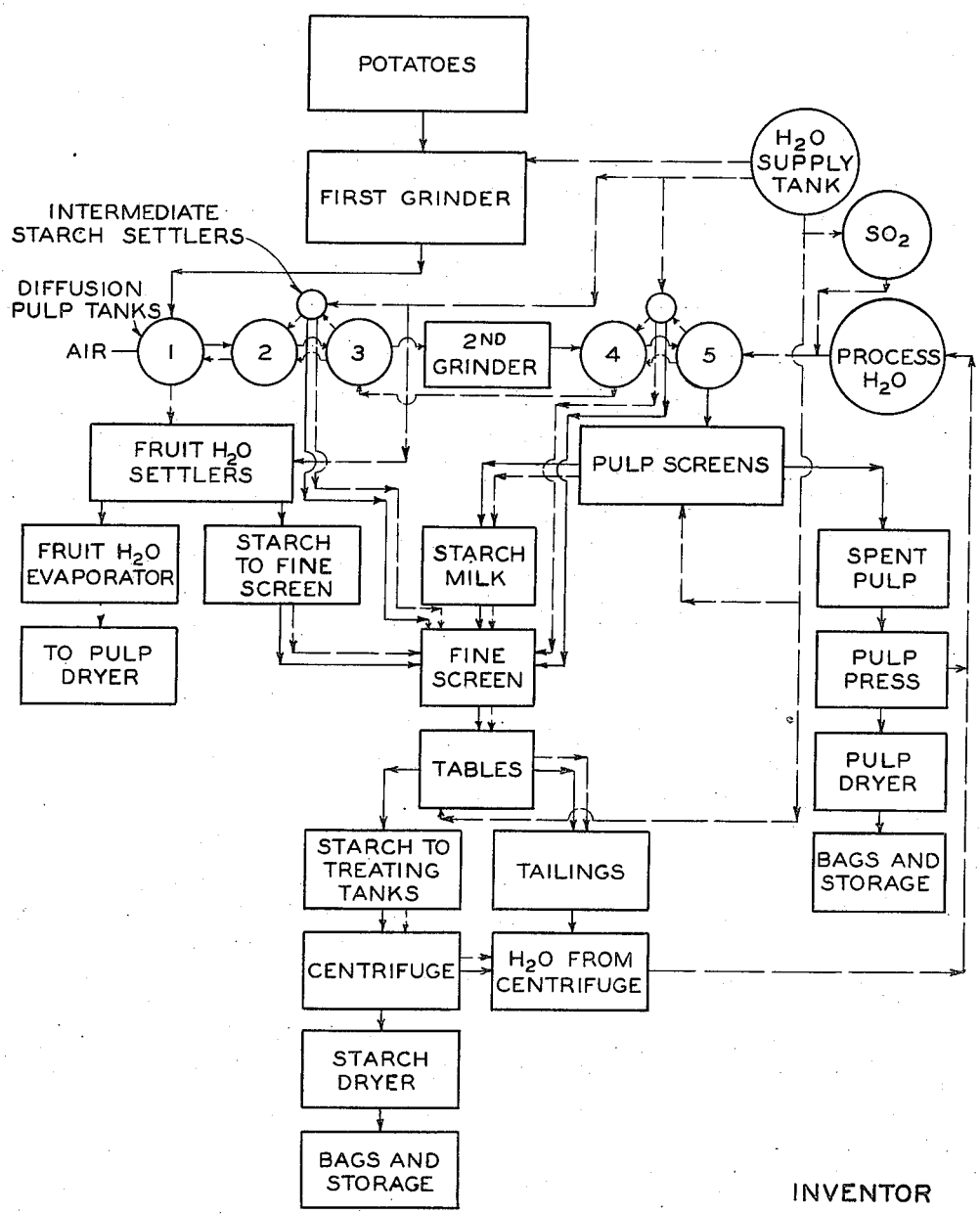

2,149,802

UNITED STATES PATENT OFFICE 2,149,802

PROCESS FOR THE EXTRACTION OF ROOT STARCHES

Francis H. Thurber, Arlington, Va., dedicated to the free use of the People of the United States Application March 18, 1938, Serial No. 196,745

4 Claims. (Cl. 127—66)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States for governmental purposes without the payment to me of any royalty thereon.

I hereby dedicate the invention herein described to the free use of the people of the United States to take effect on the granting of a patent to me.

My invention relates to an improved manufacturing process for root starches.

The objects of my invention are:

1. To remove a high percentage of solubles and colloidal material by means of a countercurrent diffusion process, thereby obtaining this material in a sufficiently high concentration to make its recovery profitable.

2. To insure a closed system in which solubles, colloidal material and starch too fine to be recovered otherwise are led off at a density sufficiently high (2½ to 5 Bé.) to make their recovery economically possible.

3. A simplified and therefore less expensive refining process, due to the fact that a large proportion of the solubles and colloidal material are removed before the pulp enters the refining system.

4. The removal of approximately ⅔ to ¾ of the recoverable starch before the pulp enters the screening system.

5. The use of a countercurrent system throughout the complete process with a consequent reduction in water requirements in the manufacturing plant.

My invention is not limited to the processing of any one root crop, but the details of the process hereinafter given are particularly applicable to the processing of sweet potatoes. Root crops, such as sweet potatoes, contain a high percentage of colloidal and water-soluble material, which is diluted with such large quantities of water in the usual open type root starch manufacturing process that its recovery is not practical. Moreover, the presence of excessive amounts of solubles and colloidal material make necessary the employment of a more extensive refining system than would otherwise be required. In testing various types of diffusion systems for the removal of solubles and colloidal material from sweet potatoes, I found that a large proportion of the colloidal material would not diffuse from whole or sliced sweet potatoes, but that the major portion would diffuse from ground potatoes when the ground material was agitated with water and could be separated from the remainder of the potato before the starch was subjected to the usual separating and refining processes. In the diffusion of root crops yielding medium or small-sized starch granules, it was noted that a large amount of starch remained suspended in the water after the settling of the pulp was practically completed, thereby making possible the recovery of at least ¾ to ⅔ of the available starch in the roots without the use of the usual refining process.

Reference is made to the flow sheet which shows diagrammatically a system suitable for carrying out the processes of this invention, diagrammatic representation being sufficient as all of the various units are of familiar construction.

The following explanation illustrates the flow through the plant at a single instant in the continuous process.

Example I.—One unit of ground sweet potatoes is treated with approximately 3½ units of an approximately 0.1% solution of sulphur dioxide, consisting of water and tailings returned from the process together with the addition of clean water from the supply tank and sulphur dioxide from the sulphur dioxide supply. As shown in the diagram the 3½ units of 0.1% sulphur dioxide water enters container (5). The mixture of ground potatoes and the solution is agitated by means of compressed air or by other suitable means for approximately 5 minutes and is then allowed to settle for approximately 30 minutes.

The containers may be of any convenient size and shape, the settling time varies with the containers and this in turn influences the amount of sulphur dioxide required to prevent fermentation. The fruit water containing solubles, colloidal material and some starch is then siphoned to the 4th container and used to treat ground potatoes in that container, similarly, fruit water from the fourth container is passed to the third, then to the second and then to the first container and finally to the fruit water settlers. The dashed line shows the direction of flow of the fruit water and the solid line shows the direction of flow of the pulp. After the starch had settled out, the fruit water from the settlers in the tests conducted ranged in density from 2½° to 5° Bé. which is considered to be sufficiently high to make the recovery of the solids economically possible. The solids in the fruit water were recovered by evaporation.

In order to set free as much starch as possible, it is generally considered to be good practice to regrind the pulp; for this reason a second pulp grinder was introduced in the system between the third and fourth containers of the diffusion system. Pulp from the diffusion system is passed to any standard type of countercurrent screening system where the remaining starch is washed out of the pulp and passed to the fine screens, together with the starch from the settlers. Spent pulp from the screens is dewatered by pressing and is then dried.

The flow of starch and water throughout the process is approximately as follows: Approximately 1½ units of clean water containing about 0.1% of sulphur dioxide per unit of potatoes enters the process on the final screen of the pulp screening system. This water picks up starch in passing back to the first screen of this system and then passes to the fine screens, together with approximately ¾ unit of clean water used in suspending starch from the fruit water settlers. The starch in this water is then purified by tabling once or by settling in a standard type of hydro-separator. Starch from the table is suspended in approximately one unit of clean water per unit of potatoes and passed to the starch treating tanks in the presence of a suitable chemical, such as sodium hydroxide for the purpose of neutralizing the starch suspension; or sodium hypochlorite, if the starch is to be bleached; or hydrochloric acid followed by neutralization with sodium hydroxide, if the starch is to be reduced in viscosity. It is then dewatered and dried. Water from the dewatering centrifuge, or filter, together with the tailing water from the tables, or hydroseparator, is all passed back to the first container of the countercurrent diffusion system. If necessary, additional water and sulphur dioxide is added at this point to bring the quantities of water and sulphur dioxide up to a volume sufficient for the removal of solubles and colloidal material, approximately 3½ units is specified at the beginning of the explanation of this example, but this volume may vary with the condition of the roots being processed. After passing through the diffusion system, this water, which now contains solubles, colloidal material and some starch from the diffusion system, is passed to the fruit water settlers. After the starch has settled out, the remaining water is passed to the evaporators, thus insuring an entirely closed system in which the water requirements are much less than in an open system. All of the solids in the potato are recovered and the recovery processes in the plant are simplified due to the smaller quantities of water handled and to the fact that high percentages of solubles and colloidal materials have been removed before the purification processes are begun.

*Example II.*—In a modification of the process described in Example I, fruit water settling tanks were introduced between the second and third and between the fourth and fifth containers of the diffusion system, and the major portion of the starch was allowed to settle in these tanks before passing to the next containers.

In a typical test conducted with this system, fruit water from the first starch settler contained 7% starch, that is, 7% of the weight of the potatoes, the second settler contained 3½% starch and the final fruit water settler contained 1½% starch. This starch was taken up in approximately ¾ unit of clean water and passed directly to the fine screens. Pulp from the final diffusion container was passed over a single pulp screen and then dewatered in a suitable press and dried. Starch from the pulp screen is also passed to the fine screens. From this point the process is identical with that described in Example I. Thus, from ⅔ to ¾ of the recoverable starch in the potatoes can be separated without the use of the customary pulp washing and screening system. The remaining ¼ to ⅓ of the recoverable starch may be left in the pulp and sold as stock feed.

In the examples described, the addition of sulphur dioxide to inhibit fermentation is prescribed. Other reagents, such as toluene, calcium hypochlorite, sodium hypochlorite, an alkaline solution of sulphur dioxide, or various Dowicides, may also be used for this purpose.

It is also possible to operate the diffusion and settling system by pumping the pulp from container to container rather than by moving the fruit water.

Recovery of solids in the fruit water by evaporation is specified, but any suitable means of recovery, such as by fermentation followed by distillation, or partial removal of the solids by precipitation with lime or other chemical reagents may be used.

In the examples given, a 5-container diffusion and settling system is prescribed. I do not wish to limit myself to a definite number of containers since the system may vary with the type of roots being processed.

Having thus described my invention, what I claim for Letters Patent is:

1. In the extraction of starch from root crops, the process which comprises grinding the roots; thence subjecting them to the action of water in the presence of a preservative agent in a countercurrent diffusion and settling system; thence permitting the recoverable starch from the water used in the diffusion system to settle in fruit water settlers; thence subjecting the pulp from the final container of the diffusion system to the action of screening; thence subjecting such starch collected from the screens and from the fruit water settlers to the action of screening; thence tabling the starch; and thence dewatering the starch and drying it; thence collecting the water from the starch dewatering unit, tailings from the tables and water from the pulp press and returning the combined material to a process water storage tank and finally to the counter-current diffusion and settling system, thus completing the cycle in the continuous system; thence evaporating the fruit water from which the recoverable starch had been previously removed by settling, thereby recovering the solids, and thence dewatering the pulp, and drying.

2. In the extraction of starch from root crops, the process which comprises grinding the roots; thence subjecting them to the action of water and in the presence of a preservative, thereby inhibiting fermentation, in a counter-current diffusion and settling system thereby removing a high percentage of solubles, colloidal material and starch too fine to be otherwise recovered; thence permitting the starch from the ground potatoes to settle in intermediate starch settlers; thence permitting the recoverable starch in the water from the final cell of the diffusion system to settle in fruit water settlers; thence combining the starch from the fruit water settlers and from the containers located between the tanks of the diffusion system and subjecting it to the action of screening; thence tabling the starch; thence dewatering the starch and drying it, thereby recovering a high percentage of the starch in the root crop without the use of the conventional pulp screening system; thence collecting the water from the starch dewatering unit, tailings from the tables and water from the pulp press and returning the combined material to a process water storage tank and finally to the countercurrent diffusion and settling system, thus completing the cycle in the continuous system; thence recovering the solids in the fruit water from which the recoverable starch had been previously removed by settling; thence dewatering the pulp, and drying.

3. In the extraction of starch from root crops, the process which comprises grinding the roots; thence subjecting them to the action of water, and in the presence of a preservative thereby inhibiting fermentation, in a counter-current diffusion and settling system, thereby removing a high percentage of solubles, colloidal material and starch too fine to be otherwise recovered; thence permitting the recoverable starch in the water from the final cell of the diffusion system to settle, in fruit water settlers; thence subjecting the pulp from the final cell of the diffusion system to the action of screening; thence subjecting the starch collected from the screens and that from the fruit water settlers to the action of screening; thence tabling the starch; and thence dewatering the starch and drying it; thence collecting the water from the starch dewatering unit, tailings from the tables, and water from the pulp press and returning the combined material to a process water storage tank and finally to the counter-current diffusion and settling system, thus completing the cycle in the continuous system; thence recovering, by evaporation, the solids in the fruit water from which the recoverable starch had been previously removed by settling, and thence dewatering the pulp from the pulp screens, and drying.

4. In the extraction of starch from root crops, the process which comprises grinding the roots; thence subjecting them to the action of water and a preservative agent in a counter-current diffusion and settling system; thence permitting the recoverable starch to settle; thence subjecting the pulp and starch to the action of screening; thence tabling the starch; and thence dewatering the starch and drying it; thence collecting the water from the starch, the pulp, and tailings, and returning the said combined material to a process water storage tank and finally to the counter-current diffusion and settling system, thus completing the cycle in the continuous system; thence evaporating the fruit water from which the recoverable starch had been previously removed by settling, and thence dewatering the pulp, and drying.

FRANCIS H. THURBER.